Figure 1:
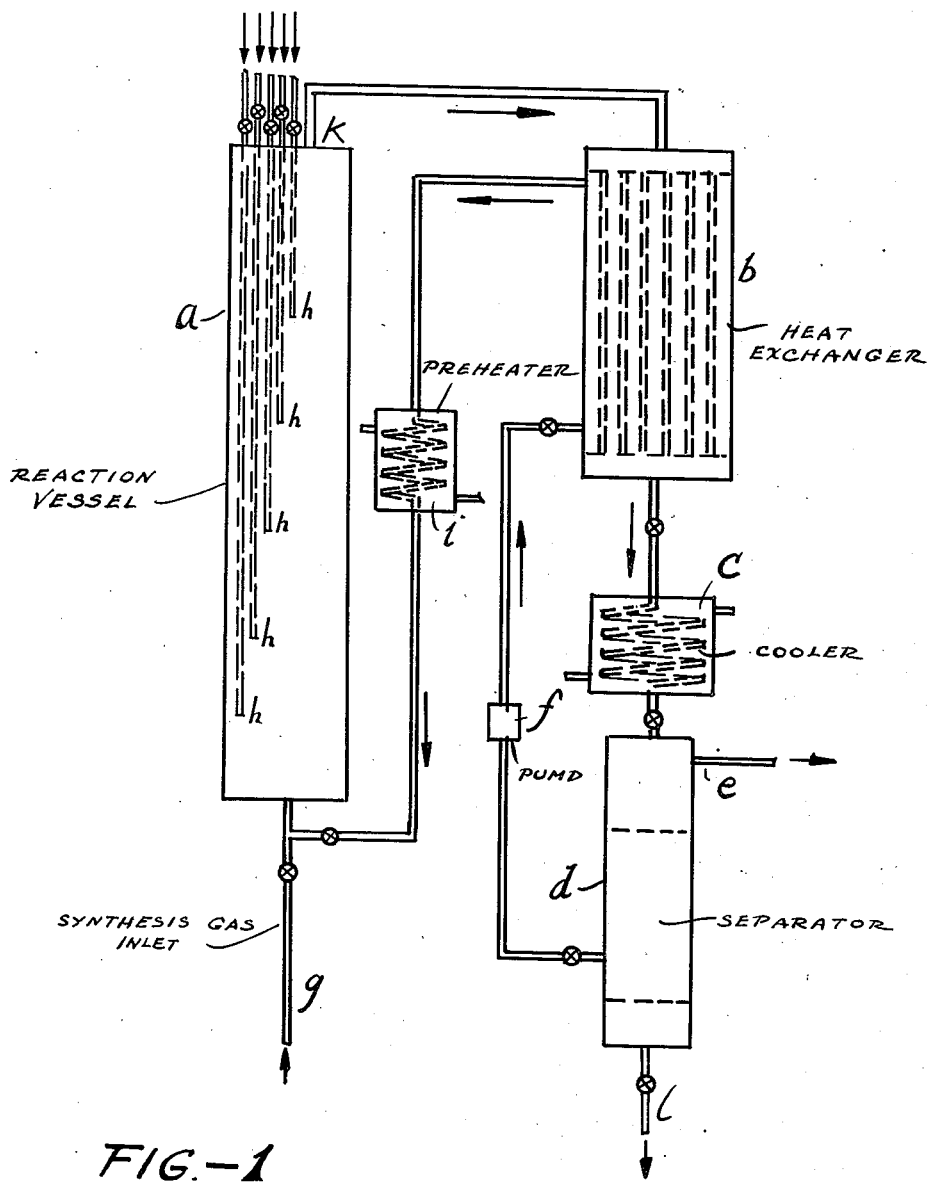

Patented May 11, 1943

2,318,602

UNITED STATES PATENT OFFICE 2,318,602

SYNTHESIS OF HYDROCARBONS

Franz Duftschmid, Heidelberg, and Eduard Linckh and Fritz Winkler, Ludwigshafen-on-the-Rhine, Germany, assignors to Standard Catalytic Company, a corporation of Delaware Application June 1, 1939, Serial No. 276,856
In Germany June 2, 1938

1 Claim. (Cl. 260—449)

The present invention relates to the conversion of carbon monoxide with hydrogen into hydrocarbons containing more than one carbon atom in the molecule.

It has already been proposed to carry out the said conversion in the presence of a liquid medium, in particular an oil obtained by the conversion of an amount of the same initial materials previously treated under the same or similar conditions, a so-called "proper oil," containing a considerable amount of constituents which are gaseous or vaporous under the temperature and pressure conditions employed.

The said liquid medium may be passed in the same direction as or in counter-current to the synthesis gases. However, when carrying out the conversion on an industrial scale and employing as the liquid medium in a counter-current cycle an oil, for example, a "proper oil" containing constituents of low boiling point, the difficulty is encountered that the large amount of hot gases flowing through the reaction vessel readily entrains the said constituents so that they are not present during the conversion in the desired amounts and as the conversion proceeds much more slowly if only the higher boiling fractions which remain liquid are present, the yields per unit of space and time of the desired conversion products are considerably reduced.

If the liquid is passed in the same direction as the gases to be reacted, the said entraining of the low boiling constituents of the liquid by the gases takes place to a considerably smaller extent. The maintenance of a uniform temperature throughout the whole reaction vessel is, however, rendered difficult because by reason of the exothermic nature of the reaction the products become increasingly hotter during their passage through the catalytic space and thus towards the end of the reaction vessel, the lower boiling constituents are vaporized to an undesirably great extent without it being possible to return them to the reaction vessel, for example, by reflux cooling, against the strong gas current.

We have now found that the said reaction in the presence of a liquid medium, in particular a "proper oil" containing a considerable amount of constituents which are gaseous or vaporous under the reaction conditions, can be carried out in a very advantageous manner by introducing the liquid medium into different zones of the reaction space through separate points of introduction in or adjacent to said zones.

The liquid medium is introduced into the vaporous zones in regulated amounts and at temperatures suitable for proper temperature regulation.

The liquid medium is preferably passed through the reaction space in a cycle. The supply of the same to the different zones may be effected in various ways. For example, the circulating medium may all be passed through the reaction space and fresh medium supplied at one or more other places, the circulating medium may, however, also be divided into a number of parts and then passed into the reaction space at different places, fresh liquid medium then being added at one or more of these places or also at one or more other places.

When working in this way, the synthesis gases may be passed either in the same direction as or in counter-current to the liquid medium. It is advantageous to work with co-current flow.

The process of the present invention renders it possible, in spite of the great evolution of heat, to maintain a practically uniform temperature throughout the whole reaction space. A very high yield per unit of time and space may therefore be obtained, especially when working at higher pressures, without by-reactions, such as formation of methane and deposition of carbon, occasioned by increase in temperature taking place.

The conversion may be carried out under the usual conditions of temperature and pressure, preferably at temperatures between about 200 and 420° C. and under ordinary or elevated pressure, for example, about 10 atmospheres, such as 20, 50, 100, 200, 500 or 700 atmospheres or more. The relative proportions of the initial gases may be varied within wide limits; the ratio of the amounts of carbon monoxide to hydrogen generally speaking lies between about 4:1 and 1:4 (measured volumetrically), say between about 2:1 to 1:3, for example, about 1:1 to 1:2. It is often advantageous to work with an excess of carbon monoxide. Diluent gases, such as carbon dioxide, nitrogen and/or methane may also be present. The liquid medium is usually added in an amount of from about 0.2 to 5 parts by volume to 100 parts by volume of initial gas (measured at atmospheric pressure and room temperature).

As the final products of the reaction there are obtained in addition to gaseous and solid hydrocarbons, mainly liquid hydrocarbons, and this is the only or main reaction taking place in the process in accordance with the present invention. The proportions of the individual products (benzine, middle oil, lubricating oil, paraffin wax)

in the total product vary according to the reaction conditions used.

In the process in accordance with the present invention stationary catalysts are usually employed.

The invention will be further described with reference to the accompanying drawings. In Figure 1 is illustrated diagrammatically a plant suitable for carrying out the process according to this invention in practice, but the invention is not restricted to the particular plant shown.

Referring to Figure 1, the circulating liquid medium is passed by the circulating pump $f$ through the heat-exchanger $b$ and the preheater $i$ into the reaction vessel $a$. The synthesis gas is introduced at $g$. The liquid leaves the vessel $a$ together with the residual gas at $k$ and is passed through the heat-exchanger $b$, into the cooler $c$ and then into the separator $d$ in which is effected the separation of the liquid constituents (including the water formed which separates at the bottom) from the gas. Fresh liquid medium is introduced through the pipes $h$ into various zones of the reaction vessel. The part of the liquid medium which is not returned from the separator $d$ through $f$ is withdrawn together with the water at $l$.

Figure 2:
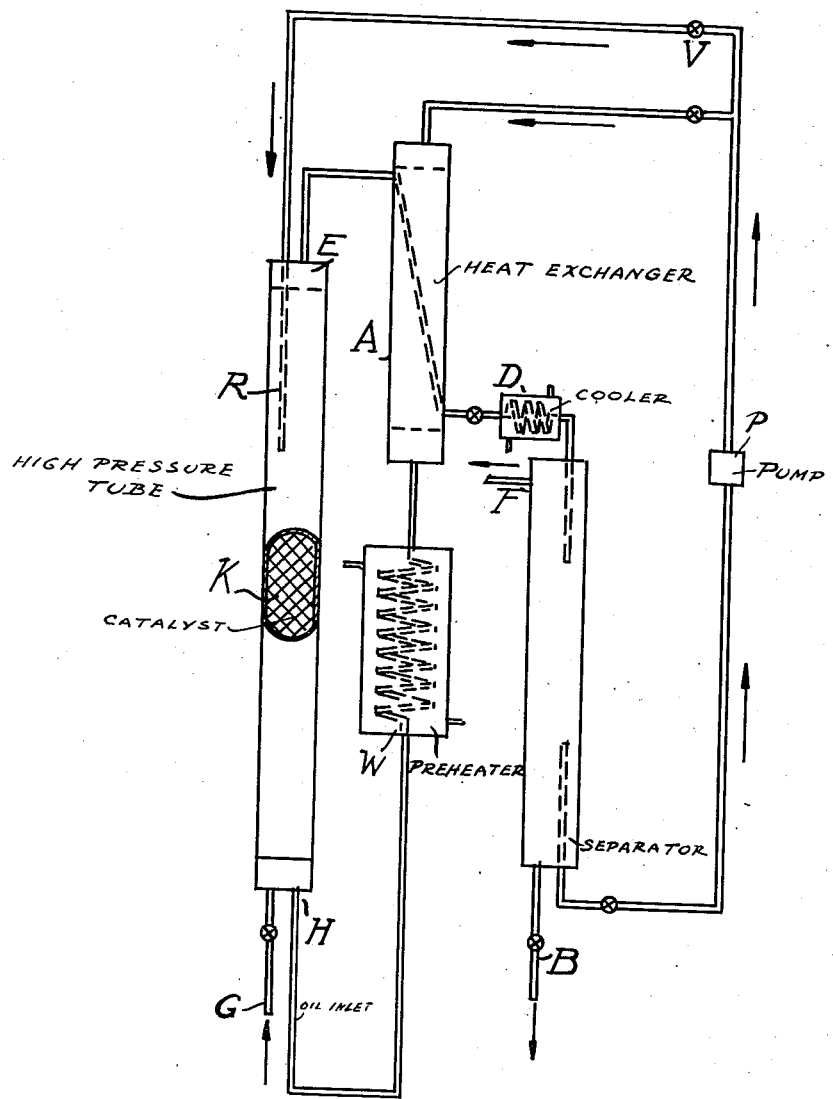

The following example, given with reference to Figure 2 of the accompanying drawings, will further illustrate how the invention may be carried out in practice, but it should be understood that the invention is not restricted to this example.

Example

The reaction vessel K is a high pressure tube of 150 millimeters internal diameter and 5.8 meters height which is filled with a catalyst in the form of pieces of from 8 to 12 millimeters in grain size. The catalyst is prepared by fusing or sintering iron with small additions of titanium oxide, manganous oxide and potassium hydroxide in a current of oxygen and is treated at 650° C. with hydrogen before being charged into the tube. Into the reaction vessel K there are introduced per hour at G 87 cubic meters of a gas of the following composition:

| | Per cent by volume |
|---|---|
| $CO_2$ | 6.0 |
| $C_nH_{2n}$ | 0.4 |
| CO | 44.8 |
| $H_2$ | 40.0 |
| $C_nH_{2n+2}$ | 4.4 |
| $N_2$ | 4.4 |

At the same time as the gas, there are introduced per hour at H about 0.6 cubic meter of oil which has been preheated to about 290° C. in the preheater W. The oil and gas flow through the vessel K in the same direction, leave the same together at E, flow in counter-current to colder circulating oil through the heat-exchanger A and the cooler D in which they are cooled to about 70 to 80° C. In the separator S, the condensed oil together with the greater part of the water containing alcohol formed during the reaction is separated from the gas. The excess of oil and the water are withdrawn at B, while the remaining oil is returned as circulating medium to the vessel K through the circulatory pump P through the heat exchanger A and the oil preheater W.

The circulating medium consists of the following fractions:

18 per cent by volume boiling up to 150° C.
21 per cent by volume boiling from 150 to 200° C.
33 per cent by volume boiling from 200° to 300° C.
28 per cent by volume boiling above 300° C.

When, after starting the conversion, the temperature in the upper part of the vessel K rises to more than 295° to 300° C., a part of the circulating oil is branched off at V and passed without preheating through a tube R which is insulated up to its outlet end and which projects 1.5 meters into the reaction vessel K. By the additional supply of oil, a uniform temperature of from 280° to 300° C. can be maintained in the reaction vessel.

The mixture of final gas and benzine vapor leaving the separator S is further cooled, whereby a large part of the benzine hydrocarbons is separated in the liquid state. The residual final gas obtained in an amount of 50 cubic meters per hour has the following composition:

| | Per cent by volume |
|---|---|
| $CO_2$ | 33.4 |
| $C_nH_{2n}$ | 3.0 |
| CO | 21.0 |
| $H_2$ | 21.8 |
| $C_nH_{2n+2}$ | 13.0 |
| $N_2$ | 7.8 |

By passing it over active carbon, further amounts of "gasol" (a mixture mainly consisting of $C_3$- and $C_4$-hydrocarbons and containing a smaller portion of $C_5$-hydrocarbons) and light benzine are recovered; the remaining gas may, after removal of carbon dioxide and if desired replenishment with fresh gas, be brought into further reaction in a second stage or returned to the same reaction space.

The products formed with a yield of 8.2 kilograms per hour consist of

| | Per cent by weight |
|---|---|
| "Gasol" | 25.0 |
| Benzine, oil and solid hydrocarbons | 69.0 |
| Alcohols | 6.0 |

What we claim is:

A process for the catalytic conversion of carbon monoxide with hydrogen into hydrocarbons with more than one carbon atom in the molecule in the presence of fixed catalysts, which comprises continuously circulating through the reaction space, co-currently with the reaction gas, a liquid medium preheated to about the desired reaction temperature, injecting into the reaction zone at spaced points along the passage of the said gases additional regulated amounts of the same liquid medium, at temperatures substantially below said reaction temperature so as to maintain the temperature throughout the reaction space within the desired limits, and employing as the said liquid medium an oil obtained by a previous conversion, said oil containing a considerable amount of constituents which are gaseous or vaporous under the reaction conditions.

FRANZ DUFTSCHMID.
EDUARD LINCKH.
FRITZ WINKLER.